US012333321B2

(12) United States Patent
Ramanathan et al.

(10) Patent No.: US 12,333,321 B2
(45) Date of Patent: Jun. 17, 2025

(54) APPLICATION-ASSISTED LIVE MIGRATION

(71) Applicant: VMware LLC, Palo Alto, CA (US)

(72) Inventors: Arunachalam Ramanathan, Union City, CA (US); Bhavana Raj Kanthur Murnad, Morgan Hill, CA (US); Jeffrey W Sheldon, Los Altos, CA (US); Pavan Narasimhaprasad, Cedar Park, TX (US); Li Zheng, Palo Alto, CA (US); Oleg Zaydman, San Jose, CA (US); Anupama Chandwani, San Jose, CA (US); Derek William Beard, Austin, TX (US)

(73) Assignee: VMWare LLC, Palo Alto, CA (US)

( * ) Notice: Subject to any disclaimer, the term of this patent is extended or adjusted under 35 U.S.C. 154(b) by 687 days.

(21) Appl. No.: 17/576,824

(22) Filed: Jan. 14, 2022

(65) Prior Publication Data

US 2023/0229471 A1    Jul. 20, 2023

(51) Int. Cl.
*G06F 9/455* (2018.01)

(52) U.S. Cl.
CPC .. *G06F 9/45558* (2013.01); *G06F 2009/4557* (2013.01)

(58) Field of Classification Search
CPC ........... G06F 2009/4557; G06F 3/0662; G06F 9/455; G06F 9/45504; G06F 9/45533; G06F 9/45541; G06F 9/45545; G06F 9/4856

See application file for complete search history.

(56) References Cited

U.S. PATENT DOCUMENTS

| | | | | |
|---|---|---|---|---|
| 8,819,678 B2 * | 8/2014 | Tsirkin | ................ | G06F 9/45558 709/227 |
| 8,924,564 B2 * | 12/2014 | Lublin | .................. | G06F 9/5088 709/227 |
| 10,404,579 B1 * | 9/2019 | Biemueller | ......... | H04L 41/0803 |
| 11,093,275 B2 * | 8/2021 | Tsirkin | .................. | G06F 9/4411 |

* cited by examiner

*Primary Examiner* — Andy Ho
(74) *Attorney, Agent, or Firm* — Quarles & Brady LLP (57) ABSTRACT

Techniques for implementing application-assisted VM provisioning operations, and in particular application-assisted live migration, are provided. In one set of embodiments, a hypervisor of a source host system can notify a guest application that the VM within which the guest application runs will be imminently live migrated from the source host system to a destination host system, prior to actually carrying out the live migration. In response, the guest application can execute one or more remedial actions that mitigate or avoid issues which may arise with respect to its runtime operation when the VM is stunned and switched over to the destination host system.

15 Claims, 5 Drawing Sheets

APPLICATION-ASSISTED LIVE MIGRATION

BACKGROUND

Unless otherwise indicated, the subject matter described in this section is not prior art to the claims of the present application and is not admitted as being prior art by inclusion in this section.

Live migration is a virtual machine (VM) provisioning operation that enables a VM to be moved from one host system to another while the VM remains operational. Live migration provides a number of important benefits for virtual infrastructure deployments, such as the ability to dynamically load balance compute workloads across host systems and the ability to carry out proactive host maintenance with minimal VM downtime.

In a typical live migration of a VM from a source host system to a destination host system, there is a brief time window (known as the "switchover" point) during which the VM is stunned (i.e., quiesced) on the source host system and its execution state is transferred to the destination host system. This usually lasts one second or less. Once the execution state transfer is complete, a migrated copy of the VM is resumed on the destination host system.

Unfortunately, many latency-sensitive applications (e.g., voice over IP (VoIP) applications, clustered database applications, etc.) cannot gracefully handle an unexpected disruption of even one second to their runtime operation; they will often fail or become unresponsive when encountering such a disruption. As a result, live migration is generally disabled in existing virtual infrastructure deployments for VMs that run these types of guest applications.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for implementing application-assisted VM provisioning operations, and in particular application-assisted live migration. As used herein, "application-assisted live migration" is a mechanism whereby a hypervisor of a source host system can notify a guest application that the VM within which the guest application runs will be imminently live migrated from the source host system to a destination host system, prior to actually carrying out the live migration. In response, the guest application can execute one or more remedial actions that mitigate or avoid issues which may arise with respect to its runtime operation when the VM is stunned and switched over to the destination host system. These actions can include, e.g., ensuring the completion of certain in-progress tasks, delaying the initiation of certain tasks, modifying its fault tolerance behavior, and/or others. The guest application can then return an acknowledgement message to the hypervisor upon completing the remedial actions, and the hypervisor can thereafter proceed with live migrating the VM.

With the foregoing mechanism, latency-sensitive guest applications can be made aware of—and thus gracefully prepare for—the disruption that occurs at the switchover point of a live migration event, rather than simply failing or becoming unresponsive. Accordingly, the techniques of the present disclosure advantageously allow live migration to be applied to VMs that run such applications, thereby preserving the important benefits of this virtualization feature.

2. Example Environment and High-Level Workflow

Figure 1:
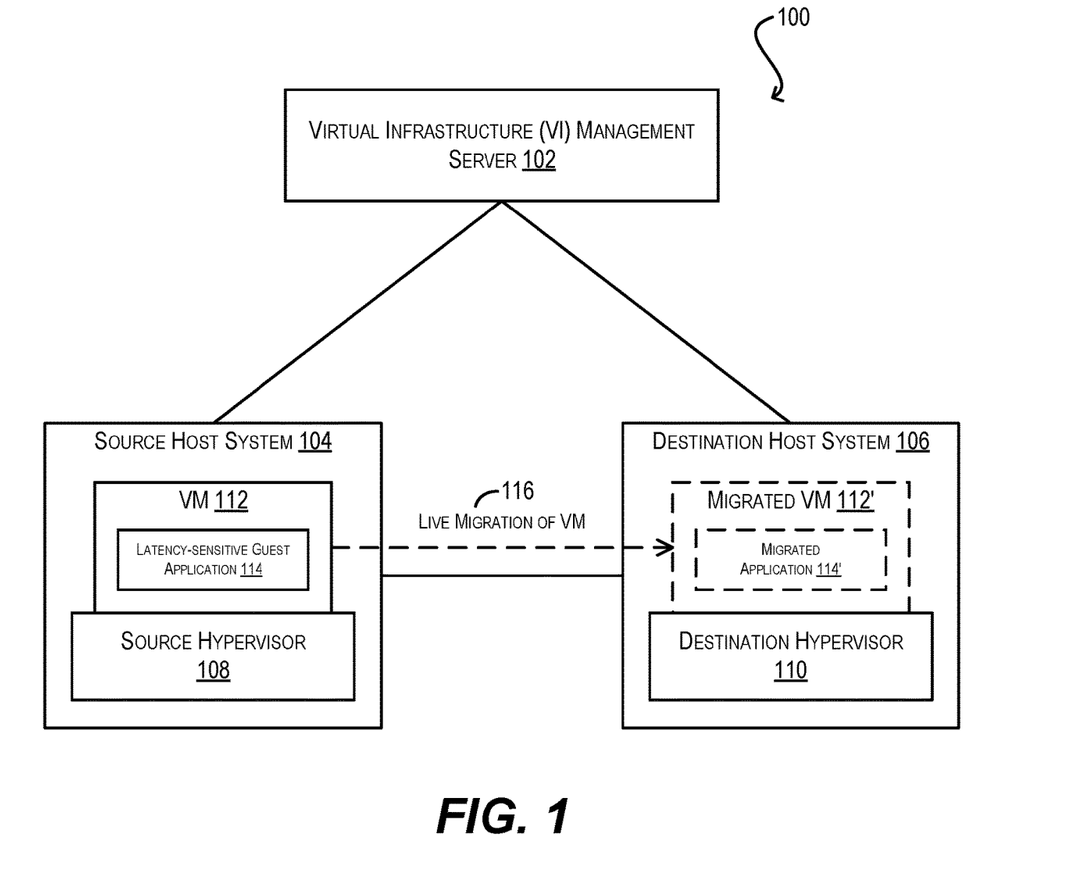
FIG. 1 depicts an example environment.

FIG. 1 depicts an example environment 100 in which embodiments of the present disclosure may be implemented. As shown, environment 100 includes a virtual infrastructure (VI) management server 102 that is communicatively coupled with a first (i.e., source) host system 104 and a second (i.e., destination) host system 106. In one set of embodiments, host systems 104 and 106 may be part of a host cluster comprising a multitude of interconnected host systems, such as a host cluster in an enterprise or cloud computing environment.

Each host system 104/106 includes, in software, a hypervisor 108/110 (i.e., source hypervisor 108 and destination hypervisor 110 respectively) that provides an execution environment for running one or more VMs. Hypervisors 108 and 110 may be a bare-metal hypervisor, a hosted hypervisor, or any other type of hypervisor known in the art. In addition, source host system 104 includes a VM 112 running on top of source hypervisor 106 that comprises a latency-sensitive guest application 114. A latency-sensitive application is one that must respond very quickly (e.g., on the order of a few milliseconds or less) to events as part of its runtime operation in order to function correctly or as expected. Examples of latency-sensitive applications include VoIP applications, clustered database applications, financial (e.g., high frequency trading) applications, real-time medical imaging applications, and so on.

In FIG. 1, it is assumed that at some point VI management server 102 will initiate a live migration of VM 112 from source host system 104 to destination host system 106 for one or more reasons (e.g., load balancing, planned maintenance at source host system 104, etc.), resulting in the creation of a migrated version of VM 112 (i.e., 112') and application 114 (i.e., 114') on the destination host side. This live migration process, which is indicated via arrow 116, is detailed in flowchart 200 of FIG. 2.

Starting with block 202 of flowchart 200, source hypervisor 108 can start a migration pre-copy phase in which source hypervisor 108 reads the guest memory pages of VM 112 and transmits the data of these guest memory pages to destination hypervisor 110 while VM 112 continues running on source host system 104. Upon receiving the data for each guest memory page, destination hypervisor 110 can write the data to a destination-side host memory (block 204). Although not explicitly shown in FIG. 2, this pre-copy phase can proceed according to multiple iterations: an initial iteration in which all of VM 112's guest memory pages are copied over to destination host system 106 and zero or more subsequent iterations in which any guest memory pages dirtied (i.e., written to) by VM 112's guest operating system (OS) since the previous pre-copy iteration are copied over again. These subsequent pre-copy iterations can continue until some criterion is met (e.g., the rate of pre-copied memory pages exceeds the page dirtying rate).

Figure 2:
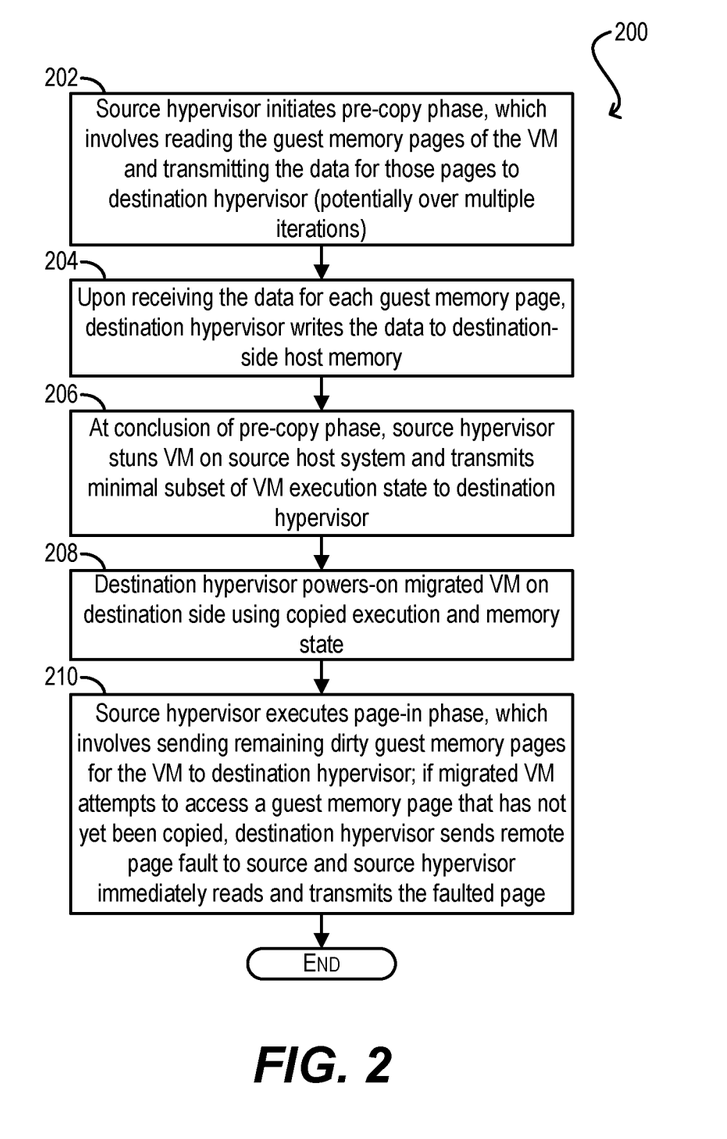
FIG. 2 depicts an example live migration process.

At the conclusion of the pre-copy phase, source hypervisor 108 can stun VM 112 on source host system 104 and transmit a minimal subset of the VM's current execution state (e.g., CPU state and registers) to destination hypervisor 110 (block 206). Destination hypervisor 110 can then power-on migrated VM 112' on destination host system 106, which causes VM 112' to begin running using the execution and memory state copied over in the previous steps (and thereby "switches over" VM execution from the source side to the destination side) (block 208).

Concurrently with block 208, source hypervisor 108 can initiate a post-migration page-in phase during which source hypervisor 108 sends to destination hypervisor 110 any remaining dirty guest memory pages for VM 112 that were not copied over during the pre-copy phase (block 210). As part of this page-in phase, if the guest OS of migrated VM 112' attempts to access a guest memory page on the destination host side that has not yet been received from source host system 104, destination hypervisor 110 can generate and send a remote page fault to source hypervisor 108 identifying that guest memory page. In response, source hypervisor 108 can immediately read and send the faulted guest memory page to destination hypervisor 110 for consumption by migrated VM 112'.

Finally, once all of the remaining dirty memory pages of VM 112 have been copied over per block 210, the live migration process is considered complete and flowchart 200 can end.

As noted in the Background section, one issue with this live migration process is that latency-sensitive applications like guest application 114 of FIG. 1 are prone to failing or becoming unresponsive upon encountering an unexpected disruption to their runtime operation, such as the brief disruption that occurs at the switchover point of block 208. For example, consider a scenario in which latency-sensitive guest application 114 is a VoIP application. In this scenario, if application 114 is in the middle of handling a VoIP call at the time of the switchover, the application may drop packets between the call participants, leading to an interruption in the call or call termination. In current virtual infrastructure deployments, this issue is worked around by simply disabling the live migration of VMs that run latency sensitive guest applications. However, this approach undesirably eliminates one of the key benefits of virtualization, which is VM mobility.

Figure 3:
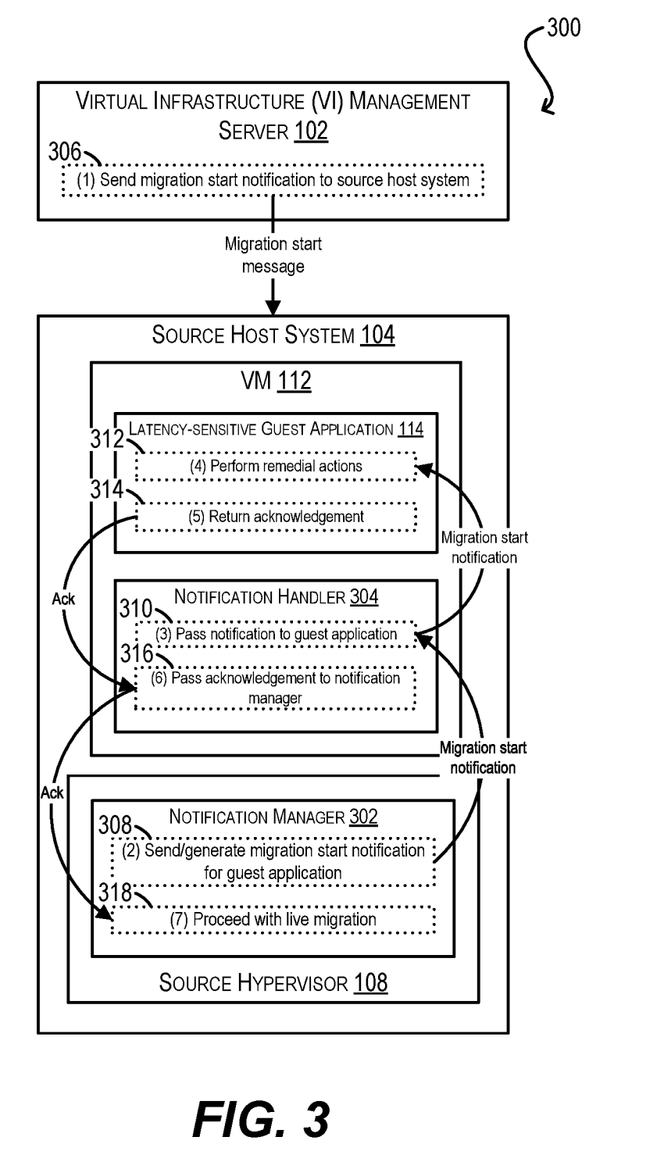
FIG. 3 depicts an enhanced version of the environment of FIG. 1 and an application-assisted live migration workflow executed within the environment according to certain embodiments.

To address the foregoing and other similar problems, FIG. 3 depicts an enhanced version of environment 100 of FIG. 1 (i.e., environment 300) that includes a novel notification manager 302 in source hypervisor 108, a novel notification handler 304 in VM 112, and a high-level workflow comprising steps (1) through (7) (reference numerals 306-318) that may be executed by these components for implementing application-assisted live migration. With this solution, latency-sensitive guest application 114 can be made aware of the live migration of VM 112 before it occurs and can control the timing of the event's start via an interactive (i.e., two-way) notification mechanism. This allows application 114 to take preparatory steps for mitigating or avoiding any undesirable consequences that may arise due to the switchover downtime and thus makes the live migration of VM 112 feasible/practical.

Starting with steps (1) and (2) of FIG. 3, VI management server 102 can initiate a live migration of VM 112 by sending a migration start message to source host system 104 and, in response, notification manager 302 can send/generate a migration start notification for notification handler 304 indicating that VM 110 will be live migrated. Significantly, notification manager 302 can send/generate this migration start notification without actually starting the live migration process.

At steps (3) and (4), notification handler 304 can receive the migration start notification and pass it to latency-sensitive guest application 114, which can take one or more remedial actions in anticipation of the live migration event while notification manager 302 waits for an acknowledgement. Generally speaking, these actions can prepare the application for the disruption that will occur when VM 112 is stunned on source host system 104 and thereby avoid application failure or other undesirable outcomes. In certain embodiments, the remedial actions can include one or more of the following:

Delaying the start of the live migration until a critical task has been completed; for example, if latency-sensitive guest application 114 is a VoIP application and is in the process of handling an emergency (e.g., 911) call, the application can wait for the call to finish before returning an acknowledgement so that the call is not interrupted Failing over application functionality to another application instance running elsewhere (e.g., on another host system)

Quiescing application functionality; for example, if latency-sensitive guest application 114 is part of a distributed database system, the system's load balancer can be updated to stop sending new database requests to application 114 so that the system can maintain its transaction SLA (service level agreement)

Increasing fault tolerance; for example, if latency-sensitive guest application 114 is a node of a clustered system that verifies the liveness of nodes via heartbeats, the application can increase its heartbeat timeout value so that it isn't inadvertently removed from the cluster at the time of live migration switchover As can be seen, the specific action(s) undertaken at step (4) may differ depending on the nature of latency-sensitive guest application 114 and the potential problems being mitigated/addressed.

Upon completing the remedial actions, latency-sensitive guest application 114 can send, via notification handler 304, an acknowledgement to notification manager 302 indicating that the application is ready for the live migration to move forward (steps (5) and (6)).

Finally, at step (7), notification manager 302 can receive the acknowledgement and source hypervisor 108 (in conjunction with destination hypervisor 110) can proceed with live migrating VM 112 from source host system 104 to destination host system 106 per the conventional live migration process shown in FIG. 2.

The remaining sections of this disclosure provide additional details for implementing the high-level workflow of FIG. 3 according to certain embodiments, as well as a description of a registration process for registering latency-sensitive guest application 114 to receive migration start notifications from notification manager 302. It should be appreciated that FIGS. 1-3 are illustrative and not intended to limit embodiments of the present disclosure. For example, while FIGS. 1-3 and the foregoing description focus on live migration, the techniques described herein can be easily extended to implement an application-assisted version of any other VM provisioning operation that temporarily disrupts the runtime of a VM, such as cloning, snapshotting, virtual disk live migration, suspend/resume, power cycle (e.g., power-off and power-on), and the like. For these other VM provisioning operations, it can be assumed that notification manager 302 will send out its operation start notification as close (in time) to the disruptive stage(s) of the operation as possible, which minimizes the amount of time that the operation will be delayed while latency-sensitive guest application 114 performs its remedial actions.

Further, although notification handler 304 is shown in FIGS. 1 and 3 as being separate from latency-sensitive guest application 114 (e.g., a standalone application, tool, etc.), in certain embodiments notification handler 304 may be integrated into application 114.

Yet further, in some embodiments VM 112 may include multiple latency-sensitive guest applications, each of which is configured to receive and process migration start notifications from notification manager 302. In these embodiments, source hypervisor 302 may delay the live migration of VM 112 until all such applications have returned an acknowledgement to notification manager 302 indicating that they are ready for the live migration to proceed. One of ordinary skill in the art will recognize other variations, modifications, and alternatives.

3. Notification Registration Workflow

Figure 4:
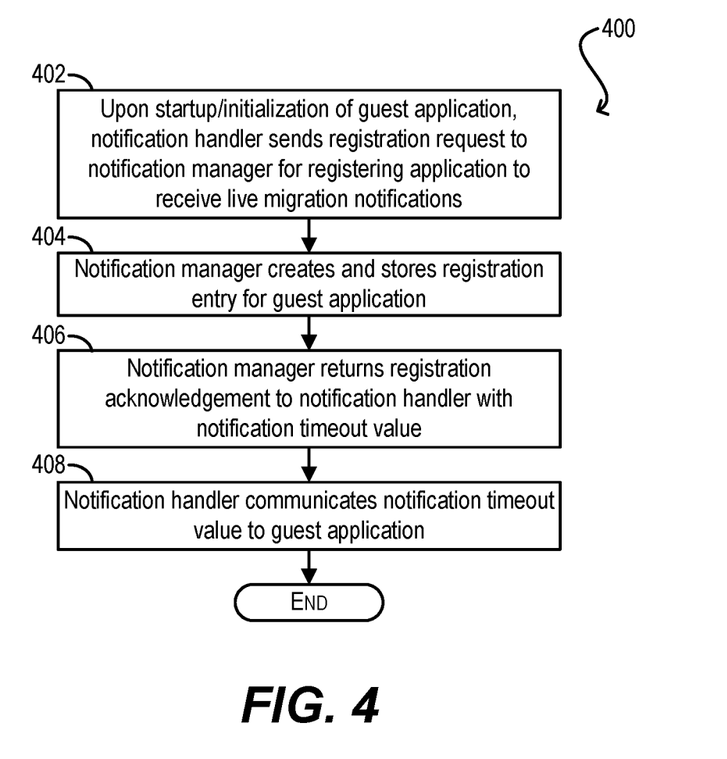
FIG. 4 depicts notification registration workflow according to certain embodiments.

FIG. 4 depicts a flowchart 400 for registering latency-sensitive guest application 114 to receive notifications pertaining to the live migration of VM 112 according to certain embodiments.

Starting with block 402, upon startup/initialization of latency-sensitive guest application 114, notification handler 304 can send (via, e.g., a remote procedure call (RPC) or some other communication mechanism) a registration request to notification manager 302 identifying guest application 114 and the type of VM provisioning operation for which application 114 wishes to receive notifications (i.e., live migration).

In response, notification manager 302 can create and store a registration entry indicating that guest application 114 is now subscribed to receive notifications for the live migration of VM 112 (block 404). In addition, notification manager 302 can return a registration acknowledgement to notification handler 304 comprising a notification timeout value (block 406). This value indicates the maximum amount of time that source hypervisor 108 will wait, after generating/sending out a migration start notification, before proceeding with the live migration operation. Accordingly, the notification timeout value allows latency-sensitive guest application 114 to know how much time it has to complete its remedial actions.

Finally, at block 408, notification handler 304 can communicate the notification timeout value to latency-sensitive guest application 114 and the flowchart can end.

4. Detailed Live Migration Workflow

Figure 5:
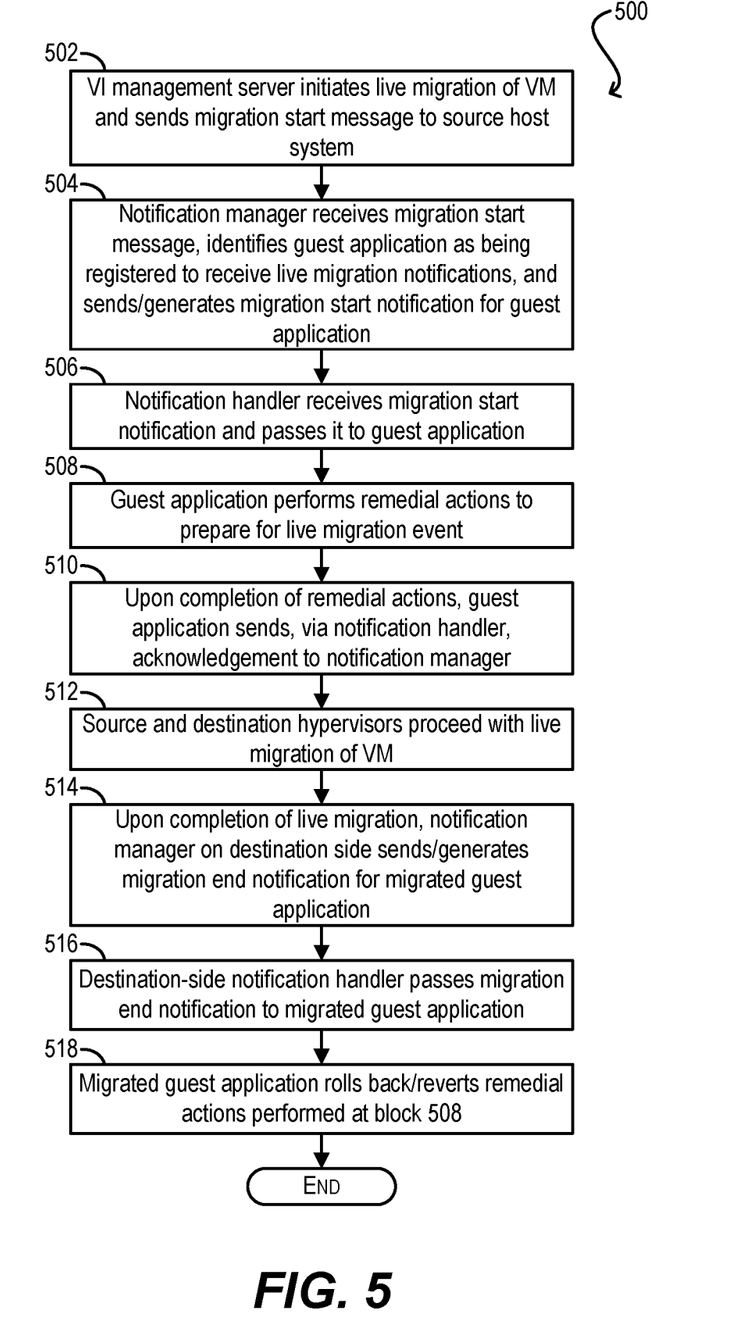
FIG. 5 depicts a more detailed version of the application-assisted live migration workflow of FIG. 3 according to certain embodiments.

FIG. 5 depicts a flowchart 500 that provides additional details for implementing the high-level application-assisted live migration workflow of FIG. 3 according to certain embodiments. Flowchart 500 assumes that latency-sensitive guest application 114 is registered to receive notifications pertaining to the live migration of VM 112 per flowchart 400 of FIG. 4.

At block 502, VI management server 102 can initiate a live migration of VM 112 from source host system 102 to destination host system 104 and send a migration start message to source host system 104.

At block 504, notification manager 302 of source hypervisor 108 can receive the migration start message, identify latency-sensitive guest application 114 as being registered to receive notifications regarding this live migration event, and send (or generate) a migration start notification for consumption by notification handler 304.

At block 506, notification handler 304 can receive (either via a pull or push mechanism) the migration start notification generated by notification manager 302 and can provide the notification to latency-sensitive guest application 114. In response, application 114 can execute its remedial actions for preparing for the live migration event (block 508). As mentioned previously, these remedial actions can include, e.g., ensuring the completion of certain tasks, quiescing certain portions of its functionality, modifying its fault tolerance behavior, etc.

Although not shown in FIG. 5, in some embodiments latency-sensitive guest application 114 can, concurrently with executing the remedial actions at block 508, receive and respond to heartbeat messages sent by notification manager 302. This allows notification manager 302 to monitor whether application 114 is running properly and is making progress as notification manager 302 waits for an acknowledgement of the migration start notification. If notification manager 302 does not receive a response to one or more of these heartbeat messages after some preconfigured heartbeat timeout value, it can conclude that application 114 has become unresponsive and can immediately proceed with the live migration of VM 112 at that point in time.

Once latency-sensitive guest application 114 has finished its remedial actions, it can send, via notification handler 304, an acknowledgement to notification manager 302 (block 510). In response, source and destination hypervisors 108 and 110 can proceed with live migrating VM 112 (block 512).

After some period of time, the live migration will be completed (or at least the switchover of VM 112 from source host system 104 to destination host system 106 will have been executed). At this point, a copy of notification manager 302 running on destination host system 106 can send/generate a migration end notification migrated guest application 114' (block 514).

Finally, at blocks 516 and 518, the destination-side notification handler within migrated VM 112' can receive and pass the migration end notification to migrated guest application 114', which can execute steps for rolling back/reverting the remedial actions previously taken at block 508. In this way, the application can return to its normal mode of operation. In the scenario where the live migration fails and VM 112/guest application 114 needs to continue running on source host system 104, source-side notification manager 302 can send/generate the migration end notification to guest application 114, which can then roll back/revert the remedial actions on the source side.

In addition, although not shown in FIG. 5, at the time latency-sensitive guest application 114 is shut down (regardless of whether it has been live migrated or not), notification handler 304 can send a deregistration request to notification manager 302 for removing the notification registration previously established for application 114 via flowchart 400 of FIG. 4. In response, notification manager 302 can delete the registration entry created for application 114.

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory, and I/O.

Further, certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the present disclosure. In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising
receiving, by a hypervisor of a first host system, a message for initiating live migration of a virtual machine (VM) from the first host system to a second host system;
generating, by the hypervisor, a migration start notification for a guest application running within the VM;
receiving, by the hypervisor, an acknowledgement from the guest application in response to the migration start notification;
upon receiving the acknowledgement, proceeding, by the hypervisor, with live migrating the VM;

generating, by a hypervisor of the second host system, a migration end notification for a migrated copy of the guest application running on the second host system; and in response to receiving the migration end notification, the migrated copy of the guest application reverting one or more actions.

2. The method of claim 1 wherein in response to receiving the migration start notification, the guest application performs the one or more actions to prepare for the live migration of the VM.

3. The method of claim 2 wherein the one or more actions include ensuring completion of an in-progress application task prior to returning the acknowledgement to the hypervisor, quiescing one or more functionalities of the guest application, or modifying fault tolerance behavior of the guest application.

4. The method of claim 2 further comprising, upon failure of the live migration of the VM:

generating, by the hypervisor, a migration end notification for the guest application running on the first host system.

5. The method of claim 1 wherein if the hypervisor does not receive the acknowledgement from the guest application within a notification timeout period, the hypervisor proceeds with live migrating the VM without waiting further for the acknowledgement.

6. A non-transitory computer readable storage medium having stored thereon program code executable by a hypervisor of a first host system, the program code embodying a method comprising:

receiving a message for initiating live migration of a virtual machine (VM) from the first host system to a second host system;

generating a migration start notification for a guest application running within the VM;

receiving an acknowledgement from the guest application in response to the migration start notification;

upon receiving the acknowledgement, proceeding with live migrating the VM;

generating, by a hypervisor of the second host system, a migration end notification for a migrated copy of the guest application running on the second host system; and in response to receiving the migration end notification, the migrated copy of the guest application reverting one or more actions.

7. The non-transitory computer readable storage medium of claim 6 wherein in response to receiving the migration start notification, the guest application performs one or more actions to prepare for the live migration of the VM.

8. The non-transitory computer readable storage medium of claim 7 wherein the one or more actions include ensuring completion of an in-progress application task prior to returning the acknowledgement to the hypervisor, quiescing one or more functionalities of the guest application, or modifying fault tolerance behavior of the guest application.

9. The non-transitory computer readable storage medium of claim 7 wherein upon failure of the live migration of the VM, the hypervisor generates a migration end notification for the guest application running on the first host system.

10. The non-transitory computer readable storage medium of claim 6 wherein if the hypervisor does not receive the acknowledgement from the guest application within a notification timeout period, the hypervisor proceeds with live migrating the VM without waiting further for the acknowledgement.

11. A host system comprising:

a hypervisor;

a volatile memory; and a non-transitory computer readable medium having stored thereon program code that causes the hypervisor to:

receive a message for initiating live migration of a virtual machine (VM) from the host system to another host system;

generate a migration start notification for a guest application running within the VM;

receive an acknowledgement from the guest application in response to the migration start notification; and upon receiving the acknowledgement, proceed with live migrating the VM;

generating, by a hypervisor of a second host system, a migration end notification for a migrated copy of the guest application running on the second host system; and in response to receiving the migration end notification, the migrated copy of the guest application reverting one or more actions.

12. The host system of claim 11 wherein in response to receiving the migration start notification, the guest application performs one or more actions to prepare for the live migration of the VM.

13. The host system of claim 12 wherein the one or more actions include ensuring completion of an in-progress application task prior to returning the acknowledgement to the hypervisor, quiescing one or more functionalities of the guest application, or modifying fault tolerance behavior of the guest application.

14. The host system of claim 12 wherein upon failure of the live migration of the VM, the hypervisor generates a migration end notification for the guest application running on the first host system.

15. The host system of claim 11 wherein if the hypervisor does not receive the acknowledgement from the guest application within a notification timeout period, the hypervisor proceeds with live migrating the VM without waiting further for the acknowledgement.

* * * * *